United States Patent
Annampedu (10) Patent No.: US 8,261,171 B2
(45) Date of Patent: Sep. 4, 2012

(54) SYSTEMS AND METHODS FOR DIVERSITY COMBINED DATA DETECTION

(75) Inventor: Viswanath Annampedu, Schnecksville, PA (US)

(73) Assignee: LSI Corporation, Milpitas, CA (US)

( * ) Notice: Subject to any disclaimer, the term of this patent is extended or adjusted under 35 U.S.C. 154(b) by 27 days.

(21) Appl. No.: 13/014,754

(22) Filed: Jan. 27, 2011

(65) Prior Publication Data

US 2012/0197920 A1 Aug. 2, 2012

(51) Int. Cl.
H03M 13/03 (2006.01)

(52) U.S. Cl. ........ 714/795; 714/794; 714/775; 375/262; 375/341

(58) Field of Classification Search .......... 714/795, 714/794, 775; 375/262, 341
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,644,564 A | 2/1987 | Dolivo et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,422,760 A * | 6/1995 | Abbott et al. | 360/46 |
| 5,521,948 A | 5/1996 | Takeuchi | |
| 5,523,902 A | 6/1996 | Pederson | |
| 5,594,341 A | 1/1997 | Majidi-Ahy et al. | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,787,125 A | 7/1998 | Mittle | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,892,632 A | 4/1999 | Behrens | |
| 5,955,783 A | 9/1999 | Ben-Efraim | |
| 5,970,104 A | 10/1999 | Zhong et al. | |

(Continued)

FOREIGN PATENT DOCUMENTS

FR 2904168 A1 1/2008

(Continued)

OTHER PUBLICATIONS

U.S. Appl. No. 12/633,319, filed Dec. 7, 2009, Ratnakar Aravind.

(Continued)

*Primary Examiner* — Guy Lamarre
*Assistant Examiner* — SunSurraye Westbrook
(74) *Attorney, Agent, or Firm* — Hamilton, DeSanctis & Cha (57) ABSTRACT

Various embodiments of the present invention provide systems and methods for data processing. For example, some embodiments of the present invention provide data processing circuits including a pattern detection circuit having at least two data detector circuits each operable to receive the same series of data samples and to provide a first detected data output and a second detected data output, respectively. In addition, the data pattern detection circuit includes a result combining circuit that is operable to assert a pattern found output based at least in part on the first detected data output and the second detected data output.

21 Claims, 6 Drawing Sheets

U.S. PATENT DOCUMENTS

| | | | |
|---|---|---|---|
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silvestrin et al. | |
| 6,081,397 A | 6/2000 | Belser | |
| 6,111,712 A | 8/2000 | Vishakhadatta et al. | |
| 6,175,600 B1 * | 1/2001 | Guillemain et al. | 375/326 |
| 6,208,478 B1 | 3/2001 | Chiu et al. | |
| 6,269,058 B1 | 7/2001 | Yamanoi et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,496,547 B1 * | 12/2002 | Powell et al. | 375/316 |
| 6,519,102 B1 | 2/2003 | Smith | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,798,823 B1 * | 9/2004 | Lee et al. | 375/130 |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,233 B1 | 3/2009 | Han et al. | |
| 7,499,238 B2 | 3/2009 | Annampedu | |
| 7,525,460 B1 | 4/2009 | Liu et al. | |
| 7,529,320 B2 | 5/2009 | Byrne et al. | |
| 7,558,177 B2 | 7/2009 | Ogura et al. | |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 2002/0001151 A1 | 1/2002 | Lake | |
| 2002/0069379 A1 | 6/2002 | Reed et al. | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0090971 A1 | 5/2003 | Gushima et al. | |
| 2003/0095350 A1 | 5/2003 | Annampedu et al. | |
| 2004/0179460 A1 | 9/2004 | Furumiya et al. | |
| 2004/0190646 A1 | 9/2004 | Aziz | |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0014385 A1 * | 1/2007 | Shiraishi | 375/341 |
| 2007/0064847 A1 | 3/2007 | Gaedke | |
| 2007/0071152 A1 | 3/2007 | Chen et al. | |
| 2007/0103805 A1 | 5/2007 | Hayashi et al. | |
| 2007/0104300 A1 | 5/2007 | Esumi et al. | |
| 2007/0183073 A1 | 8/2007 | Sutardja et al. | |
| 2007/0230015 A1 | 10/2007 | Yamashita | |
| 2007/0263311 A1 | 11/2007 | Smith | |
| 2007/0280059 A1 | 12/2007 | Cheng et al. | |
| 2008/0056403 A1 | 3/2008 | Wilson | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park | |
| 2009/0052075 A1 | 2/2009 | Annampedu | |
| 2009/0142620 A1 | 6/2009 | Yamamoto et al. | |
| 2009/0245448 A1 | 10/2009 | Ran et al. | |
| 2009/0274247 A1 | 11/2009 | Galbraith et al. | |
| 2010/0171560 A1 * | 7/2010 | Verschueren | 331/1 A |
| 2011/0211377 A1 * | 9/2011 | Uno | 363/124 |
| 2012/0036173 A1 | 2/2012 | Annampdeu | |

FOREIGN PATENT DOCUMENTS

| | | |
|---|---|---|
| GB | 2286952 A | 8/1995 |
| WO | WO 03/047091 | 6/2003 |
| WO | WO 2008/009620 | 1/2008 |

OTHER PUBLICATIONS

U.S. Appl. No. 12/838,601, filed Aug. 19, 2010, Wilson, Ross.

U.S. Appl. No. 12/851,475, filed Aug. 5, 2010, Annampedu, Viswanath.

U.S. Appl. No. 12/887,327, filed Sep. 21, 2010, LIu et al.

U.S. Appl. No. 12/894,221, filed Sep. 30, 2010, Yang et al.

U.S. Appl. No. 12/946,048, filed Nov. 15, 2010, Yang et al.

U.S. Appl. No. 12/947,962, filed Nov. 17, 2010, Liu et al.

U.S. Appl. No. 12/946,033, filed Nov. 15, 2010, Yang et al.

U.S. Appl. No. 12/955,789, filed Nov. 29, 2010, Annampedu et al.

U.S. Appl. No. 12/955,821, filed Nov. 29, 2010, Annampedu et al.

U.S. Appl. No. 12/972,904, filed Dec. 20, 2010, Viswanath Annampedu.

U.S. Appl. No. 13/100,021, filed May 3, 2011, Xia, Haitao et al.

U.S. Appl. No. 13/113,210, filed May 23, 2011, Zhang, Xun et al.

U.S. Appl. No. 13/014,754, filed Jan. 27, 2011, Viswanath Annampedu.

U.S. Appl. No. 13/009,067, filed Jan. 19, 2011, Zhang, Xun et.al.

U.S. Appl. No. 13/050,048, filed Mar. 17, 2011, Xia, Haitao et.al.

U.S. Appl. No. 13/096,873, filed Apr. 28, 2011, Wilson, Ross S.

U.S. Appl. No. 13/173,088, filed Jun. 30, 2011, Grundvig, et al.

U.S. Appl. No. 13/186,267, filed Jul. 19, 2011, Xia, Haitao et al.

U.S. Appl. No. 13/242,983, filed Sep. 23, 2011, Grundvig, Jeffery P.

Annampedu, V. et al, "Adaptive Algorithms for Asynchronous Detection of Coded Servo Signals Based on Interpolation", IEEE Transactions on Magnetics, vol. 41, No. 10, Oct. 2005.

Aziz and Annampedu, "Asynchronous Maximum Likelihood (ML) Detection of Servo repeatable Run Out (RRO) Data" Magnetics Conf. IEEE InternationalMay 2006.

Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.

Kryder, M. et al "Heat Assisted Magnetic Recording" Proc. IEEE, vol. 96, No. 11, p. 1810, Nov. 2008.

Weller et al "Thermal Limits in Ultrahigh-density Magnetic Recording" IEEE Trans. Magn. vol. 35, No. 6, p. 4423, Nov. 1999.

Hagenauer J et al, "A Viterbi Algorithm with Soft-Decision Outputs and its Applications" Nov. 27, 1989, pp. 1680-1686.

Polikar R., "Ensemble Based Systems in Decision Making" IEEE Circuits and Systems Magazine, IEEE Service Center Jul. 1, 2006 pp. 21-45.

* cited by examiner

SYSTEMS AND METHODS FOR DIVERSITY COMBINED DATA DETECTION

BACKGROUND OF THE INVENTION

The present inventions are related to systems and methods for data processing, and more particularly to pattern detection in a data processing system.

A typical storage device includes a magnetic storage medium storing information that is magnetically represented on the storage medium. A head is disposed in relation to the storage medium that senses the magnetically represented information and provides an electrical signal corresponding to the magnetically represented information. This electrical signal is ultimately passed to a data detection circuit that performs one or more data detection processes in order to recover the information originally written to the storage medium. The information maintained on the storage medium typically includes both user data and synchronization data. The user data may be considered a random pattern, while the synchronization data is generally a defined pattern that may be used, for example, to identify a location on a storage medium.

Various existing data processing systems utilize, for example, a threshold detector circuit to process received synchronization data and identify location data. Such a circuit operates well where the received digital samples are pre-processed correctly to account for noise. However, in some cases such pre-processing is less than optimal. This results in an inability to establish location, and thereby to degraded performance.

Hence, for at least the aforementioned reasons, there exists a need in the art for advanced systems and methods for data processing.

BRIEF SUMMARY OF THE INVENTION

The present inventions are related to systems and methods for data processing, and more particularly to pattern detection in a data processing system.

Various embodiments of the present invention provide data processing circuits that include a pattern detection circuit. The pattern detection circuit includes at least two data detector circuits each operable to receive the same series of data samples and to provide a first detected data output and a second detected data output, respectively. In addition, the data pattern detection circuit includes a result combining circuit that is operable to assert a pattern found output based at least in part on the first detected data output and the second detected data output.

In some instances of the aforementioned embodiments, the result combiner circuit further includes: a first comparator circuit, a second comparator circuit, and a combiner circuit. The first comparator circuit is operable to compare the first detected data output to a pattern and to assert a first preliminary pattern found indication when a match between the first detected data output and the pattern occurs. The second comparator circuit is operable to compare the second detected data output to the pattern and to assert a second preliminary pattern found indication when a match between the second detected data output and the pattern occurs. The combiner circuit is operable to assert the pattern found output based at least in part on the first preliminary pattern found indication and the second preliminary pattern found indication. In particular cases, the combiner circuit is operable to assert the pattern found output when both the first preliminary pattern found indication and the second preliminary pattern found indication indicate a pattern found. In other cases, the combiner circuit is operable to assert the pattern found output when one of the first preliminary pattern found indication and the second preliminary pattern found indication indicates a pattern found.

In various instances of the aforementioned embodiments, the first data detector circuit applies a first data detection algorithm that is different from a second data detection algorithm applied by the second data detector circuit. In some such cases, the first data detector circuit and the second data detector circuit may be, but are not limited to, a threshold detector circuit, a two state detector circuit, or a Viterbi algorithm detector circuit. In some cases, the first data detector circuit operates on the same subset of the series of data samples in parallel coincident with the second data detector circuit.

In some instances of the aforementioned embodiments, the pattern detection circuit further includes a third data detector circuit. The third data detector circuit is operable to receive the series of data samples and to provide a third detected data output. In such instances, the result combining circuit is operable to assert the pattern found output based at least in part on the first detected data output, the second detected data output, and the third detected data output. In some such instances, the first data detector circuit is a Viterbi algorithm detector circuit, the second data detector circuit is a threshold detector circuit, and the third data detector circuit is a two state detector circuit.

Other embodiments of the present invention provide methods for pattern detection that includes: receiving a series of data samples; performing a first data detection on the series of data samples to yield a first detected output; performing a second data detection on the series of data samples to yield a second detected output; and asserting a pattern found signal based at least in part on the first detected output and the second detected output. The second data detection is different from the first data detection. In some cases, the first data detection and the second data detection are performed in parallel.

In some instances of the aforementioned embodiments, the first data detection is a threshold data detection, a two state data detection, or a Viterbi algorithm data detection; and the second data detection is a threshold data detection, a two state data detection, and a Viterbi algorithm data detection. In some instances of the aforementioned embodiments, the methods further include performing a third data detection on the series of data samples to yield a third detected output. In such cases, the third data detection is different from the first data detection and the second data detection, and asserting the pattern found signal based at least in part on the first detected output, the second detected output, and the third detected output. In some such cases, the first data detection is a Viterbi algorithm data detection, the second data detection is a threshold data detection, and the third data detection is a two state data detection. In one or more cases, the first data detection, the second data detection, and the third data detection are performed in parallel.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to pattern detection in a data processing system.

Some embodiments of the present invention provide systems and methods for servo or other pattern data processing which offers flexibility in pattern identification. For example, the embodiments may allow for a tradeoff between misidentification of a data pattern (i.e., improperly identifying a pattern) while not missing any data patterns, and missing identification (i.e., failing to identify a pattern) while reducing misidentification (i.e., improperly identifying a pattern). For example, some embodiments of the present invention use two or more data detector circuits each operating to identify the same pattern in a received data set. The results from each of the data detection circuits are combined into a single indication of whether the pattern was found or not.

Figure 1:
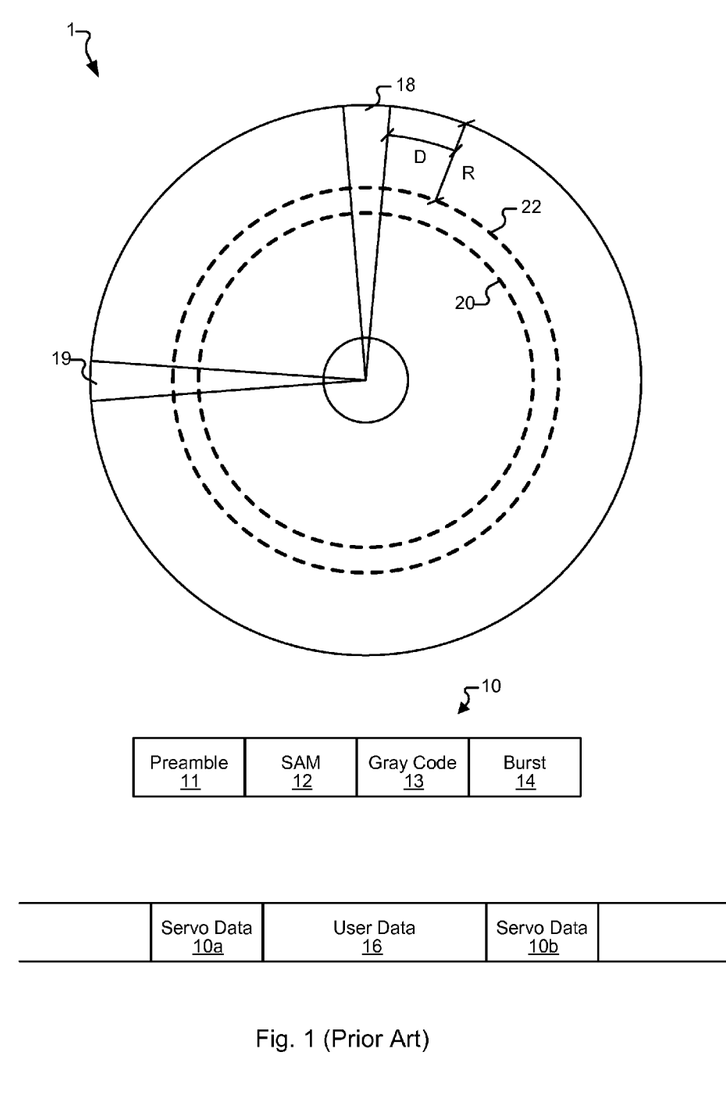
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14. Between the servo data bit patterns 10a and 10b, a user data region 16 is provided.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18.

Figure 2:
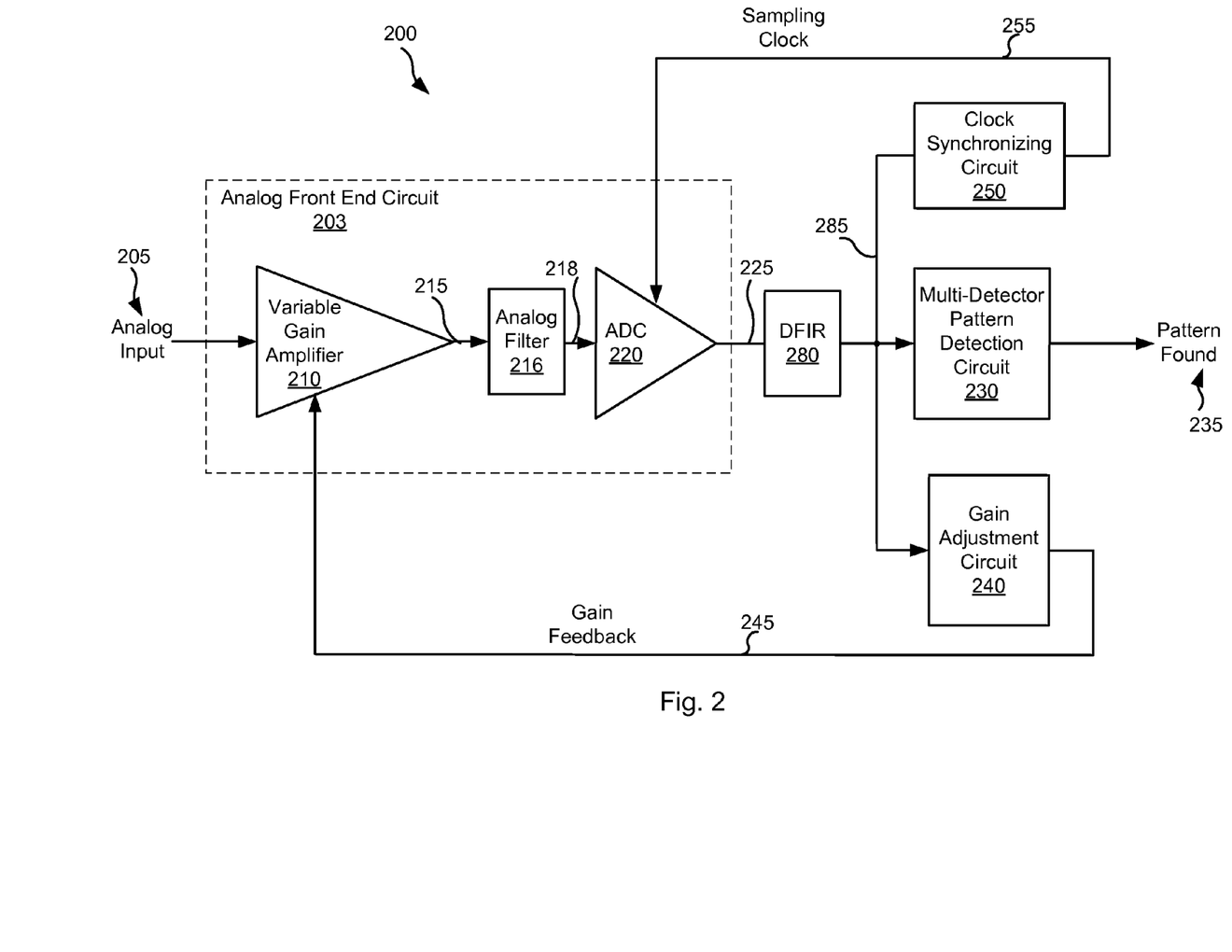
FIG. 2 depicts a data processing circuit including a multi-detector location detection circuit in accordance with various embodiments of the present invention.

Turning to FIG. 2, a data processing circuit 200 is depicted that includes a multi-detector location detection circuit in accordance with various embodiments of the present invention. Data processing circuit 200 includes an analog front end circuit 203 that performs various analog processing on a received analog input signal 205. In the depicted implementation, analog front end circuit 203 includes a variable gain amplifier circuit 210, an analog filter circuit 216, and an analog to digital converter circuit 220. Variable gain amplifier circuit 210 amplifies analog input signal 205 by a gain indicated as a gain feedback 245. Variable gain amplifier circuit 210 may be any circuit known in the art that is capable of applying a variable gain to a received input. Variable gain amplifier circuit 210 provides the amplified signal as an amplified output 215. Amplified output 215 is provided to analog filter circuit 216 where it is filtered to reduce, for example, noise in amplified output 215. The filtered signal is provided as a filtered output 218 to analog to digital converter circuit 220. Analog to digital converter circuit 220 samples filtered output 218 at a phase and frequency controlled by a sampling clock 255 to yield a series of digital samples 225. Analog to digital converter circuit 220 may be any circuit known in the art that is capable of converting an analog input signal to a corresponding series of digital samples. Based upon the disclosure provided herein, one of ordinary skill in the art will recognize a variety of analog front end circuits that may be used in relation to different embodiments of the present invention.

Digital samples 225 are provided to a digital finite impulse response circuit 280 that performs a filtering process on the received samples to yield a filtered output 285. Filtered output 285 is provided to a clock synchronizing circuit 250 that is operable to synchronize a sampling clock 255 to the phase and frequency of the received analog input 205. Clock synchronizing circuit 250 may be any circuit known in the art that is capable of synchronizing to a data input. In some embodiments of the present invention, clock synchronizing circuit 250 includes a phase lock loop circuit. Based upon the disclosure provided herein, one of ordinary skill in the art will recognize a variety of synchronizing circuits that may be used in relation to different embodiments of the present invention. Filtered output 285 is provided to a gain adjustment circuit 240 that is operable to yield a gain adjustment provided as a gain feedback 245 that is provided to variable gain amplifier circuit 210. Gain adjustment circuit 240 may be any circuit known in the art that is capable of providing a gain adjustment. Based upon the disclosure provided herein, one of ordinary skill in the art will recognize a variety of gain feedback circuits that may be used in relation to different embodiments of the present invention.

Filtered output 285 is also provided to a multi-detector pattern detection circuit 230. Multi-detector pattern detection circuit 230 includes two or more data detector circuits each operating on filtered output 285 to yield a pattern found output 235. The results from each of the two or more data detector circuits are combined to determine whether to assert pattern found output 235. In one particular embodiment of the present invention, pattern found output 235 is asserted whenever one of the two or more data detector circuits indicate that the pattern was found. Alternatively, in other embodiments of the present invention, pattern found output 235 is asserted whenever all of the two or more data detector circuits indicate that the pattern was found. In yet other embodiments of the present invention, found output 235 is asserted whenever more than one or less than all of the two or more data detector circuits indicate that the pattern was found.

In some cases, multi-detector pattern detection circuit 230 uses multiple detector circuits that each implement a distinct data detection algorithm (e.g., Viterbi algorithm, two state algorithm, or a threshold based algorithm) to improve performance of pattern detection in a random noise environment. In such cases, the same set of received samples are provided to each of the multiple detector circuits. There is not necessarily any phase shift or offset between the data set provided to each of the detectors. The detectors included in the multi-detector pattern detection circuit 230 may be chosen because of their independence one from another. For example, one detector may be chosen that relies on peaks in a received sample set, another detector operates to minimize the error between received samples and targeted samples, and yet another detector maximizes the matched filter outputs for different bits transitions. The way each of the aforementioned detectors fail in different ways. Since each detector fails differently, the chances of all three detectors failing at the same time for the same set of samples are reduced.

Figure 3:
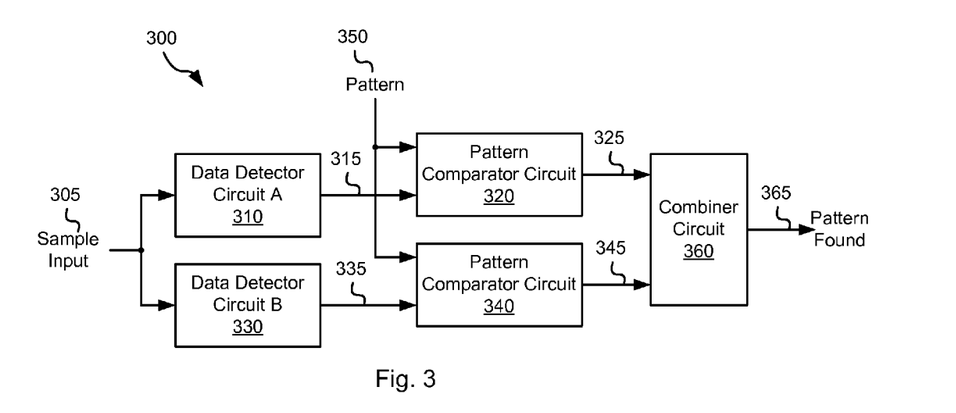
FIG. 3 shows a multi-detector location detection circuit in accordance with one or more embodiments of the present invention.

Turning to FIG. 3, a multi-detector location detection circuit 300 is depicted in accordance with one or more embodiments of the present invention. Multi-detector location detection circuit 300 may be used in place of multi-detector location detection circuit 230. Multi-detector location detection circuit 300 includes two data detector circuits 310, 330 (data detector circuit A and data detector circuit B) that each received data via a sample input 305. Sample input 305 receives filtered output 285. Data detector circuit A 310 applies a different detection algorithm than that applied by data detector circuit B 330. Each of data detector circuit A 310 and data detector circuit B 330 may be, for example, a Viterbi algorithm data detector circuit, a two state data detector circuit, or a threshold detector circuit. As an example, in one embodiment of the present invention, data detector circuit A 310 is a Viterbi algorithm detector circuit and data detector circuit B is a threshold detector circuit. Based upon the disclosure provided herein, one of ordinary skill in the art will recognize a variety of types of detectors that may be used in relation to different embodiments of the present invention, and combinations thereof.

Where, for example, data detector circuit A 310 implements a threshold detection algorithm, the implemented threshold algorithm is applied to the series of samples received via sample input 305 to yield a series of binary samples 315 that are provided to a pattern comparator circuit 320. As an example, where the series of samples extend from a value of +20 to a value of −20, the values above zero may be defined to be binary '1's and the values equal to zero may be define to be binary '0's. Thus, the series of samples 20, 10, 0, −1, −10, −20, −20, 1, 10 would yield the following binary series after processing through the threshold detector: 1, 1, 0, 0, 0, 0, 1, 1. In some cases, a threshold above which a sample is identified as a binary '1' and below which a sample is identified as a binary '0' may be programmable allowing for post implementation adjustment of the threshold detector operation to compensate for DC offset or other factors. The series of binary values may then be used for further processing.

In some cases, the received data is wide bi-phase encoded. In such cases, the wide bi-phase encoding is decoded leaving only the original series of binary values. For example, where the wide bi-phase encoding includes representing a '0' by the pattern '1100', representing a '1' by the pattern '0011', and the received samples are 20, 10, 0, −10, −20, 0, 20, 1, −20, −10, 5, 10, 20, 3, −20, 0, the threshold detection process first assigns a binary '0' to all values of zero or less and a binary '1' to all values greater than zero to yield the following wide bi-phase encoded pattern: 1100, 0011, 0011, 1100. The preceding bi-phase encoded pattern is then decoded to yield the following series of binary values: 0, 1, 1, 0. This series of binary values may then be used for further processing.

The series of binary values recovered from the threshold data detection processing implemented by data detector circuit A 310 are then compared with a predefined or programmable pattern 350. In one particular embodiment of the present invention, pattern 350 is a sector address mark pattern. In other embodiments of the present invention, pattern 350 is a Gray code pattern. Based upon the disclosure provided herein, one of ordinary skill in the art will recognize a variety of patterns that may be used as pattern 350. Where a match is found between pattern 350 and binary samples 315, a preliminary indication 325 of a pattern found is provided to a combiner circuit 360.

Where, for example, data detector circuit B implements a Viterbi algorithm detection process, the implemented Viterbi algorithm is applied to the series of samples received via sample input 305 to yield a series of binary samples 335 that are provided to a pattern comparator circuit 340. This Viterbi algorithm detection process may be consistent with any Viterbi algorithm detection process known in the art. An example Viterbi algorithm is described in J. Hagenauer and P. Hoeher, "A Viterbi algorithm with soft-decision outputs and its applications," in Proc. IEEE GLOBECOM, pp. 47.11-47.17, Dallas, Tex., November 1989. The entirety of the aforementioned reference is incorporated herein by reference for all purposes. In some cases, the received data is wide bi-phase encoded. In such cases, the wide bi-phase encoding is decoded leaving only the original series of binary values that is provided for further processing. Where wide bi-phase encoding is not used, the binary values provided by the Viterbi algorithm detection process are provided for further processing. The series of binary values recovered from the threshold data detection processing implemented by data detector circuit B 330 are then compared with pattern 350. Where a match is found between pattern 350 and binary samples 335, a preliminary indication 345 of a pattern found is provided to a combiner circuit 360.

It should be noted that either data detector circuit A 310 or data detector circuit B 330 may be replaced by a two state data detector circuit. Such a two state data detector circuit operates consistent with that discussed in U.S. patent application Ser. No. 12/851,475 entitled "Systems and Methods for Sequence Detection in Data Processing" and filed by Annampedu et al. on Aug. 5, 2010. The entirety of the aforementioned reference is incorporated herein for all purposes.

Preliminary indication 325 and preliminary indication 345 are combined by combiner circuit 360 to yield a pattern found output 365. Combiner circuit 360 may be implemented such that pattern found output 365 is asserted whenever one or both of preliminary indication 325 and preliminary indication 345 indicate that the pattern was found in accordance with the following pseudocode:

If (preliminary indication 325 is asserted OR preliminary indication 345 is asserted)
{
assert pattern found output 365
}
Else
{
de-assert pattern found output 365
}

In other embodiments of the present invention, combiner circuit 360 may be implemented such that pattern found output 365 is asserted only whenever both of preliminary indication 325 and preliminary indication 345 indicate that the pattern was found in accordance with the following pseudocode:

If (preliminary indication 325 is asserted AND preliminary indication 345 is asserted)
{
assert pattern found output 365
}
Else
{
de-assert pattern found output 365
}

Figure 4:
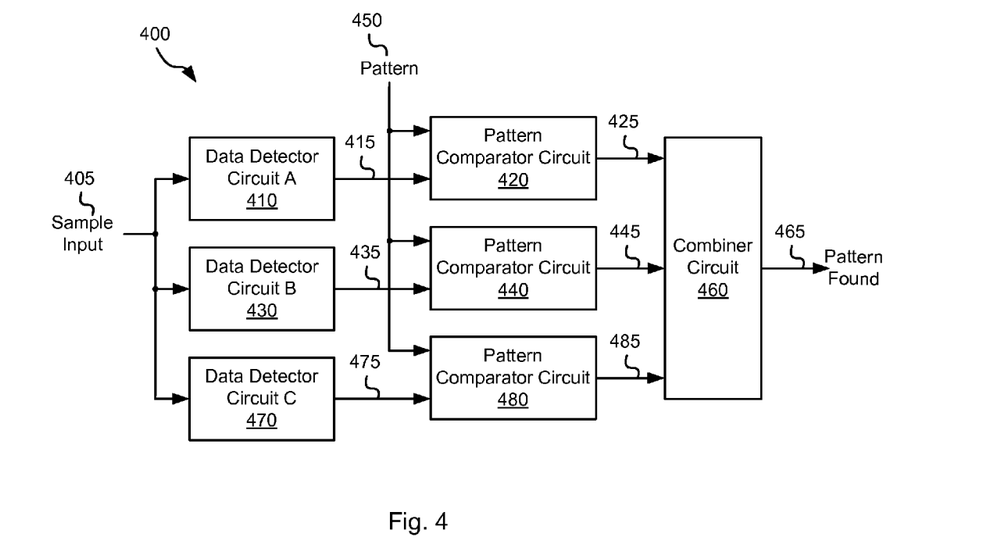
FIG. 4 depicts another multi-detector location detection circuit in accordance with other embodiments of the present invention.

Turning to FIG. 4, another multi-detector location detection circuit 400 is shown in accordance with other embodiments of the present invention. Multi-detector location detection circuit 400 may be used in place of multi-detector location detection circuit 230. Multi-detector location detection circuit 400 includes three data detector circuits 410, 430, 470 (data detector circuit A, data detector circuit B, and data detector circuit C) that each received data via a sample input 405. Sample input 405 receives filtered output 285. Data detector circuit A 410 applies a different detection algorithm than that applied by either data detector circuit B 430, and data detector circuit B 430 applies a different algorithm than that applied by data detector circuit C 470. Each of data detector circuit A 410, data detector circuit B 430 and data detector circuit 470 may be, for example, a Viterbi algorithm data detector circuit, a two state data detector circuit, or a threshold detector circuit. As an example, in one embodiment of the present invention, data detector circuit A 410 is a Viterbi algorithm detector circuit, data detector circuit B is a threshold detector circuit, and data detector circuit C is a two state detector circuit. Based upon the disclosure provided herein, one of ordinary skill in the art will recognize a variety of types of detectors that may be used in relation to different embodiments of the present invention, and combinations thereof.

Data detector A 410 provides a series of binary samples 415 to a pattern comparator circuit 420. The series of binary values recovered from the threshold data detection processing implemented by data detector circuit A 410 are then compared with a predefined or programmable pattern 450. In one particular embodiment of the present invention, pattern 450 is a sector address mark pattern. In other embodiments of the present invention, pattern 450 is a Gray code pattern. Based upon the disclosure provided herein, one of ordinary skill in the art will recognize a variety of patterns that may be used as pattern 450. Where a match is found between pattern 450 and binary samples 415, a preliminary indication 425 of a pattern found is provided to a combiner circuit 460.

Data detector B 430 provides a series of binary samples 435 to a pattern comparator circuit 440. The series of binary values recovered from the Viterbi algorithm detection processing implemented by data detector circuit B 430 are then compared with pattern 450. Where a match is found between pattern 450 and binary samples 435, a preliminary indication 445 of a pattern found is provided to combiner circuit 460. Data detector C 470 provides a series of binary samples 475 to a pattern comparator circuit 480. The series of binary values recovered from the two state algorithm detection processing implemented by data detector circuit C 480 are then compared with pattern 450. Where a match is found between pattern 450 and binary samples 475, a preliminary indication 485 of a pattern found is provided to combiner circuit 460.

Preliminary indication 425, preliminary indication 445, and preliminary indication 485 are combined by combiner circuit 460 to yield a pattern found output 465. Combiner circuit 460 may be implemented such that pattern found output 465 is asserted whenever one or more of preliminary indication 425, preliminary indication 445 and preliminary indication 485 indicate that the pattern was found in accordance with the following pseudocode:

If (preliminary indication 425 is asserted OR preliminary indication 445 is asserted OR preliminary indication 485)
{
assert pattern found output 465
}
Else
{
de-assert pattern found output 365
}

In other embodiments of the present invention, combiner circuit 460 may be implemented such that pattern found output 465 is asserted only whenever all of preliminary indication 425, preliminary indication 445 and preliminary indication 485 indicate that the pattern was found in accordance with the following pseudocode:

If (preliminary indication 425 is asserted AND preliminary indication 445 is asserted AND preliminary indication 485 is asserted)
{
assert pattern found output 465
}
Else
{
de-assert pattern found output 465
}

In yet other embodiments of the present invention, combiner circuit 460 may be implemented such that pattern found output 465 is asserted whenever two or more of preliminary indication 425, preliminary indication 445 and preliminary indication 485 indicate that the pattern was found in accordance with the following pseudocode:

If ((preliminary indication 425 is asserted AND preliminary indication 445 is asserted) OR
(preliminary indication 425 is asserted AND preliminary indication 485 is asserted) OR
(preliminary indication 445 is asserted AND preliminary indication 485 is asserted))
)
{
assert pattern found output 465
}
Else
{
de-assert pattern found output 465
}

Figure 5:
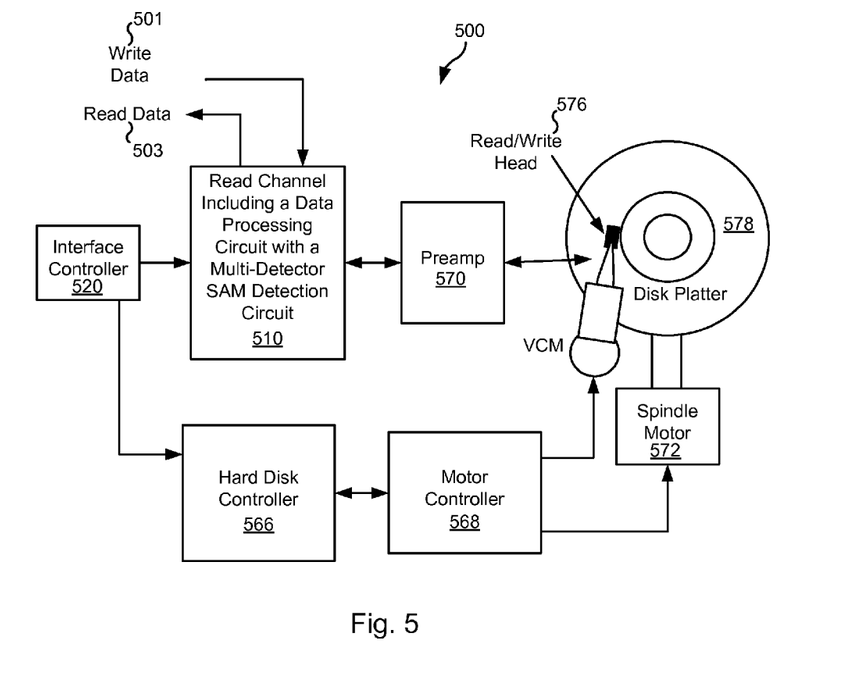
FIG. 5 depicts a storage device including a read channel circuit with a multi-detector location detection circuit in accordance with some embodiments of the present invention.

Turning to FIG. 5, a storage system 500 including a read channel circuit 510 with a multi-detector location detection circuit is shown in accordance with some embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. As part of decoding the received information, read channel circuit 510 performs a data detection to identify a sector address mark within the data. This data detection process utilizes a multi-detector location detection circuit. Such a multi-detector location detection circuit may include circuitry similar to that discussed above in relation to FIG. 2, FIG. 3 and/or FIG. 4, and/or may operate consistent with the method discussed below in relation to FIG. 7. A write operation is substantially the opposite of the preceding read operation with write data 501 being provided to read channel circuit 510. This data is then encoded and written to disk platter 578.

It should be noted that storage system 500 may be integrated into a larger storage system such as, for example, a RAID (redundant array of inexpensive disks or redundant array of independent disks) based storage system. It should also be noted that various functions or blocks of storage system 500 may be implemented in either software or firmware, while other functions or blocks are implemented in hardware.

Figure 6:
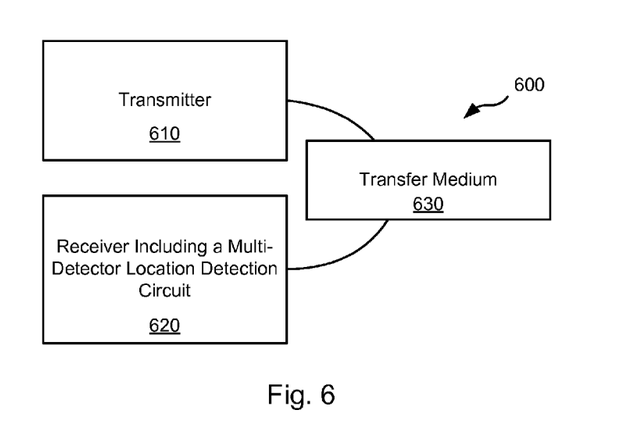
FIG. 6 shows a transmission system including a receiver with a multi-detector location detection circuit in accordance with one or more embodiments of the present invention.

Turning to FIG. 6, a transmission system 600 including a receiver 620 with a multi-detector location detection circuit is shown in accordance with one or more embodiments of the present invention. Transmission system 600 includes a transmitter 610 that is operable to transmit encoded information via a transfer medium 630 as is known in the art. The encoded data is received from transfer medium 630 by receiver 620. Receiver 620 incorporates a multi-detector location detection circuit. Such a multi-detector location detection circuit may include circuitry similar to that discussed above in relation to FIG. 2, FIG. 3 and/or FIG. 4, and/or may operate consistent with the method discussed below in relation to FIG. 7.

Figure 7:
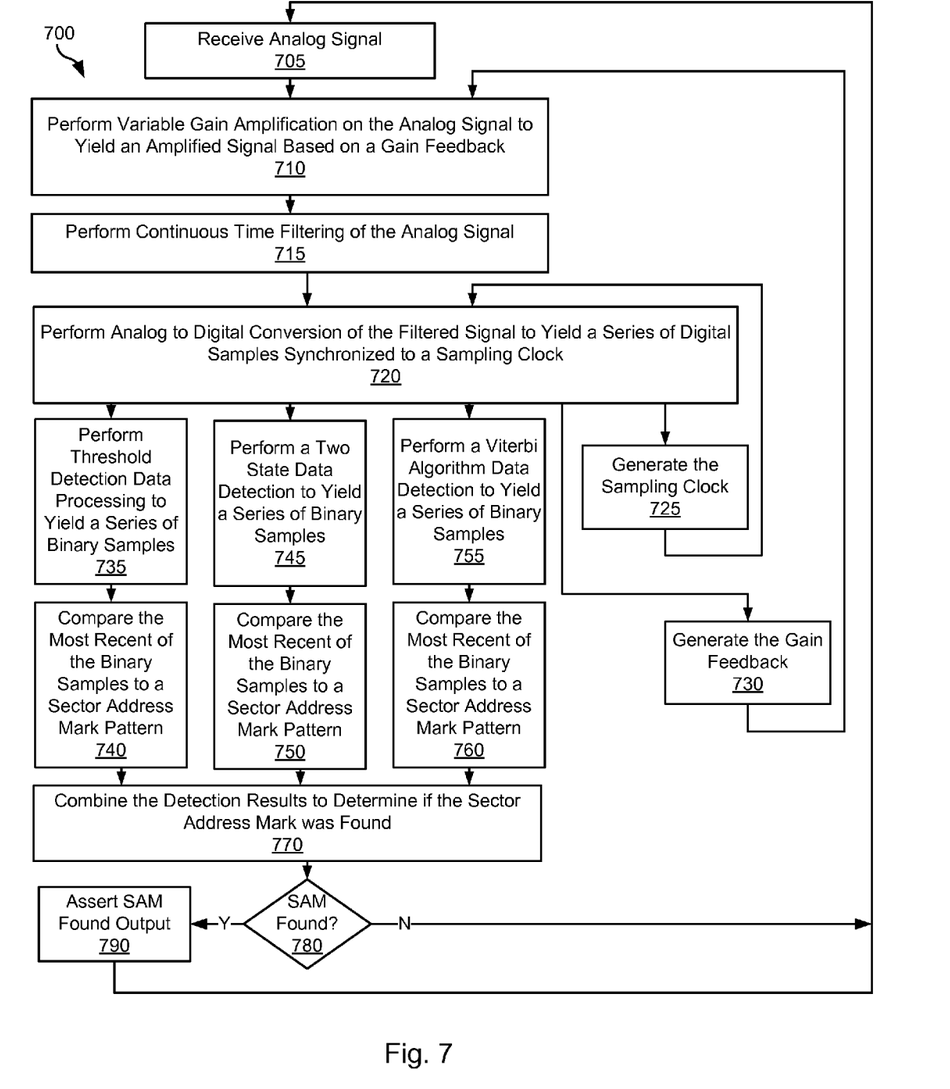
FIG. 7 is a flow diagram showing a method in accordance with various embodiments of the present invention for data processing using a multi-detector approach.

Turning to FIG. 7, a flow diagram 700 shows a method in accordance with various embodiments of the present invention for data processing using a multi-detector approach. Following flow diagram 700, an analog signal is received (block 705). This analog signal may be derived, for example, by sensing information stored on a storage medium or as part of receiving information via a wireless transmission device. Based upon the disclosure provided herein, one of ordinary skill in the art will recognize a variety of sources of the analog signal. A variable gain amplification is applied to the analog signal to yield an amplified signal (block 710). The gain applied in the amplification is based upon a gain feedback. Any approach known in the art for variable gain amplification may be used. It should also be noted that in some cases a fixed amplification process may be used in place of the variable gain amplification. Analog (i.e., continuous time) filtering is applied to the amplified signal to yield a filtered signal (block 715). Based upon the disclosure provided herein, one of ordinary skill in the art will recognize a variety of analog filters and/or filtering processes that may be employed in accordance with different embodiments of the present invention. Further, in some cases no filtering is applied. The filtered signal is provided to an analog to digital converter circuit where it is converter to a series of digital samples (block 720). The digital samples correspond to the amplified output at a phase and frequency governed by a sampling clock. Any analog to digital conversion process known in the art may be used.

Using the provided series of digital samples, a clock generation process is performed to create a sampling clock that is synchronized to the input data stream (block 725). This clock generation may be done in accordance with any process known in the art for generating a clock that is synchronized to the phase/frequency of an input data set. Based upon the disclosure provided herein, one of ordinary skill in the art will recognize a variety of clock generation processes that may be used in relation to different embodiments of the present invention.

In addition, a gain feedback controlling the gain of the variable gain amplification process is generated using the provided series of digital samples (block 730). This gain feedback generation may be done in accordance with any process known in the art for establishing a gain for a variable gain amplifier. Based upon the disclosure provided herein, one of ordinary skill in the art will recognize a variety of gain feedback generation processes that may be used in relation to different embodiments of the present invention.

A threshold detection algorithm is applied to the series of digital samples to yield a series of binary samples (block 735). For example, where the digital samples extend from a value of +20 to a value of −20, the values above zero may be defined to be binary '1's and the values equal to zero may be define to be binary '0's. Thus, the series of digital samples 20, 10, 0, −1, −10, −20, −20, 1, 10 would yield the following binary series after processing through the threshold detector: 1, 1, 0, 0, 0, 0, 1, 1. In some cases, a threshold above which a sample is identified as a binary '1' and below which a sample is identified as a binary '0' may be programmable allowing for post implementation adjustment of the threshold detector operation to compensate for DC offset or other factors. The series of binary values may then be used for further processing.

In some cases, the received data is wide bi-phase encoded. In such cases, the wide bi-phase encoding is decoded leaving only the original series of binary values. For example, where the wide bi-phase encoding includes representing a '0' by the pattern '1100', representing a '1' by the pattern '0011', and the received samples are 20, 10, 0, −10, −20, 0, 20, 1, −20, −10, 5, 10, 20, 3, −20, 0, the threshold detection process first assigns a binary '0' to all values of zero or less and a binary '1' to all values greater than zero to yield the following wide bi-phase encoded pattern: 1100, 0011, 0011, 1100. The preceding bi-phase encoded pattern is then decoded to yield the following series of binary values: 0, 1, 1, 0. This series of binary values may then be used for further processing.

The series of binary values recovered from the threshold data detection processing (block 735) are then compared with a predefined or programmable sector address mark pattern (block 740). In one particular embodiment of the present invention, the sector address mark pattern is a nine bit pattern serving as a synchronization mark in a received data set representing a particular location within the data set. Where a match is found between the sector address mark pattern and the received series of binary values (block 740), a first preliminary indication of a sector address mark is provided.

Figure 8:
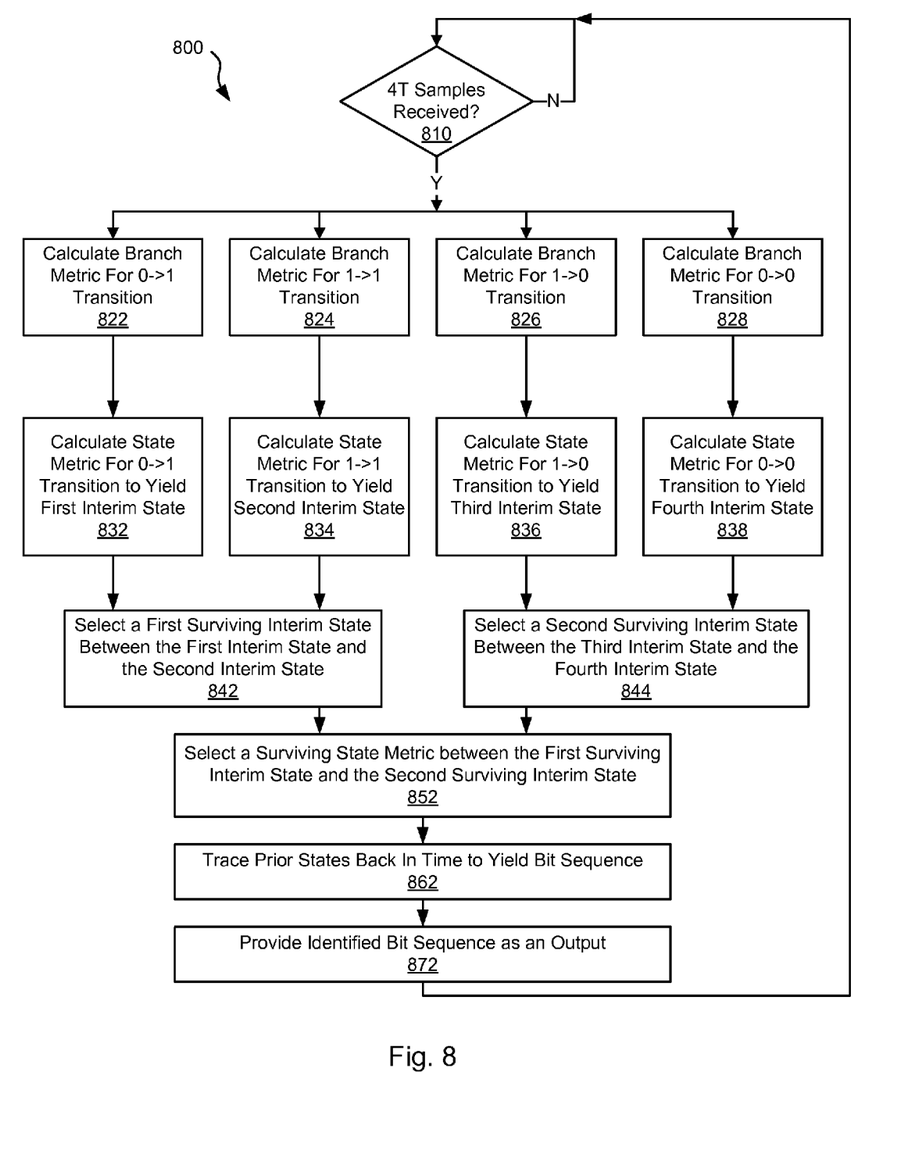
FIG. 8 is a flow diagram depicting an example of such a data detection that may be used in relation to one or more embodiments of the present invention.

A two state data detection is applied to the series of digital samples to yield a series of binary samples (block 745). FIG. 8 is a flow diagram 800 depicting an example of such a data detection that may be used in relation to one or more embodiments of the present invention. Following flow diagram 800, it is determined whether 4T samples have been received (block 810). As previously described, 4T samples implies four samples for each bit transition. It should be noted that more or fewer samples per bit transition may be used in relation to different embodiments of the present invention. Once the prescribed number of samples has been received (block 810), the received samples are multiplied by respective correlator values to yield path values for the transitions from zero to zero, from zero to one, from one to zero, and from one to one. As an example, the four samples are: 51, −35, −102, −112. A prior zero state value is '12' and a prior one state value is '124'. In particular, a branch metric is calculated of a zero to one transition using a correlator value corresponding to a zero to one transition ('−1 0 1 1') (block 822). Using the aforementioned example inputs, the branch metric is calculated in accordance with the following equation:

Branch Metric=(−1*51)+(0*−35)+(1*−102)+(1*−112)=−265.

Similarly, a branch metric is calculated of a one to one transition using a correlator value corresponding to a one to one transition ('0 −1 0 1') (block 824). Using the aforementioned example inputs, the branch metric is calculated in accordance with the following equation:

Branch Metric=(0*51)+(−1*−35)+(0*−102)+(1*−112)=−77.

A branch metric is calculated of a zero to zero transition using a correlator value corresponding to a one to zero transition ('1 0 −1 −1') (block 826). Using the aforementioned example inputs, the branch metric is calculated in accordance with the following equation:

Branch Metric=(1*51)+(0*−35)+(−1*−102)+(−1*−112)=265.

In addition, a branch metric is calculated of a one to zero transition using a correlator value corresponding to a zero to zero transition ('0 1 0 −1') (block 828). Using the aforementioned example inputs, the branch metric is calculated in accordance with the following equation:

Branch Metric=(0*51)+(1*−35)+(0*−102)+(−1*−112)=77.

Once the branch metrics are available, the branch metrics are added to the value of the state from which the branch metric was derived. In particular, a state metric is calculated for the zero to one transition state to yield a first interim state (block 832). Using the aforementioned example inputs, the first interim state value is calculated in accordance with the following equation:

First Interim Value=Prior Zero State Value+0→1 Branch Metric=12−265=−253.

A state metric is calculated for the one to one transition state to yield a second interim state (block 834). Using the aforementioned example inputs, the second interim state value is calculated in accordance with the following equation:

Second Interim Value=Prior One State Value+1→1 Branch Metric=124−77=47.

A state metric is calculated for the zero to zero transition state to yield a third interim state (block 836). Using the aforementioned example inputs, the third interim state value is calculated in accordance with the following equation:

Third Interim Value=Prior Zero State Value+0→0 Branch Metric=12+265=277.

In addition, a state metric is calculated for the zero to zero transition state to yield a fourth interim state (block 838). Using the aforementioned example inputs, the fourth interim state value is calculated in accordance with the following equation:

Fourth Interim Value=Prior Zero State Value+1→0 Branch Metric=124+77=201.

A first surviving state metric is selected between the previously calculated first interim value and the second interim value (block 842). This is done by selecting the larger of the first interim value and the second interim value which in this example is '47'. This value is stored as the prior one state metric for use in multiplying the next series of data samples (e.g., in blocks 822, 824, 826, 828). In addition, a second surviving state metric is selected between the previously calculated third interim value and the fourth interim value (block 844). This is done by selecting the larger of the third interim value and the fourth interim value which in this example is '389'. This value is stored as the prior zero state metric for use in multiplying the next series of data samples (e.g., in blocks 822, 824, 826, 828). Based on the previously determined first surviving interim state and second surviving interim state, a surviving state metric is selected (block 852). This is done by selecting the larger of the first surviving interim state and the second surviving interim state which in this example is '389'. The surviving state metric in this case is the zero state. This surviving state metric corresponds to the most recent bit in the detected sequence, and is used to trace back in time to yield the detected bit sequence over the desired number of bits (block 862). This is done by determining prior state metrics in the path that ultimately resulted in the calculation of the value of the surviving state metric. The identified bit sequence is then provided as an output (block 872), and the process is repeated for the next series of digital samples that are received (block 810). Additional discussion of a two state algorithm is described in U.S. patent application Ser. No. 12/851,475 entitled "Systems and Methods for Sequence Detection in Data Processing" and filed by Annampedu et al. on Aug. 5, 2010. The entirety of the aforementioned reference is incorporated herein for all purposes.

Returning to FIG. 7, the most recent of the resulting binary samples (block 745) are compared with a sector address mark pattern (block 750). Again, in one particular embodiment of the present invention, the sector address mark pattern is a nine bit pattern serving as a synchronization mark in a received data set representing a particular location within the data set. Where a match is found between the sector address mark pattern and the received series of binary values (block 750), a second preliminary indication of a sector address mark is provided.

A Viterbi algorithm data detection process is applied to the series of digital samples to yield a series of binary samples (block 755). This Viterbi algorithm detection process may be consistent with any Viterbi algorithm detection process known in the art. An example Viterbi algorithm is described in J. Hagenauer and P. Hoeher, "A Viterbi algorithm with soft-decision outputs and its applications," in Proc. IEEE GLOBECOM, pp. 47.11-47.17, Dallas, Tex., November 1989. The entirety of the aforementioned reference is incorporated herein by reference for all purposes. In some cases, the received data is wide bi-phase encoded. In such cases, the wide bi-phase encoding is decoded leaving only the original series of binary values that is provided for further processing. Where wide bi-phase encoding is not used, the binary values provided by the Viterbi algorithm detection process are provided for further processing.

The series of binary values recovered from the Viterbi algorithm data detection processing (block 755) are then compared with the predefined or programmable sector address mark pattern (block 760). Again, in one particular embodiment of the present invention the sector address mark pattern is a nine bit pattern serving as a synchronization mark in a received data set representing a particular location within the data set. Where a match is found between the sector address mark pattern and the received series of binary values (block 760), a third preliminary indication of a sector address mark is provided.

Each of the first preliminary indication, the second preliminary indication and the third preliminary indication are combined to determine whether to assert a sector address mark (block 770). In one particular embodiment of the present invention, a sector address mark is identified whenever any of the first preliminary indication, the second preliminary indication, or the third preliminary indication is asserted. Alternatively, in other embodiments of the present invention, a sector address mark is identified whenever two or more of the first preliminary indication, the second preliminary indication, or the third preliminary indication is asserted. In yet another embodiment of the present invention, a sector address mark is identified whenever all of the first preliminary indication, the second preliminary indication, and the third preliminary indication is asserted. The choice of whether to identify a sector address mark as being found may be biased toward identifying a sector address mark at the expense of occasional misidentification of a sector address mark by requiring only one of the first preliminary indication, the second preliminary indication, or the third preliminary indication is asserted. Alternatively, the choice may be more balanced between identification of sector address marks, while at the same time avoiding misidentification by requiring assertion of more than one of the first preliminary indication, the second preliminary indication, or the third preliminary indication. As yet another alternative, the choice may be biased toward avoiding a misidentification of a sector address mark at the expense of missing a sector address mark by requiring all detection processes to identify a sector address mark.

Where a sector address mark is identified based upon the first preliminary indication, the second preliminary indication, and/or the third preliminary indication (block 780), a SAM found signal is asserted (block 790). Alternatively, where a sector address mark is not identified based upon the first preliminary indication, the second preliminary indication, and/or the third preliminary indication (block 780), the SAM found signal remains de-asserted.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Further, it should be noted that while multi-detector location detection circuits have been described as having two or three data detector circuits operating in parallel that four or more data detector circuits may be employed either in parallel, series, or some combination of parallel and series. Yet further, the foregoing embodiments were described as using distinct types of data detection processes, and it should be note that other data detection processes such as, for example, a maximum a posteriori data detection process may be used in place of or in addition to those described above. Therefore, the above description should not be taken as limiting the scope of the invention, which is defined by the appended claims.

What is claimed is:

1. A data processing circuit, the data processing circuit comprising:
   a pattern detection circuit including:
      a first data detector circuit operable to receive a series of data samples and to provide a first detected data output;
      a second data detector circuit operable to receive the series of data samples and to provide a second detected data output; and
      a result combining circuit operable to assert a pattern found output based at least in part on the first detected data output and the second detected data output.

2. The data processing circuit of claim 1, wherein the result combiner circuit further comprises:
   a first comparator circuit operable to compare the first detected data output to a pattern and to assert a first preliminary pattern found indication when a match between the first detected data output and the pattern occurs;
   a second comparator circuit operable to compare the second detected data output to the pattern and to assert a second preliminary pattern found indication when a match between the second detected data output and the pattern occurs; and a combiner circuit operable to assert the pattern found output based at least in part on the first preliminary pattern found indication and the second preliminary pattern found indication.

3. The data processing circuit of claim 2, wherein the combiner circuit is operable to assert the pattern found output when both the first preliminary pattern found indication and the second preliminary pattern found indication indicate a pattern found.

4. The data processing circuit of claim 2, wherein the combiner circuit is operable to assert the pattern found output when one of the first preliminary pattern found indication and the second preliminary pattern found indication indicates a pattern found.

5. The data processing circuit of claim 1, wherein the first data detector circuit applies a first data detection algorithm that is different from a second data detection algorithm applied by the second data detector circuit.

6. The data processing circuit of claim 5, wherein:
the first data detector circuit is selected from a group consisting of: a threshold detector circuit, a two state detector circuit, and a Viterbi algorithm detector circuit; and
the second data detector circuit is selected from a group consisting of: a threshold detector circuit, a two state detector circuit, and a Viterbi algorithm detector circuit.

7. The data processing circuit of claim 1, wherein the first data detector circuit operates on the same subset of the series of data samples in parallel coincident with the second data detector circuit.

8. The data processing circuit of claim 1, wherein the pattern detection circuit further comprises:
a third data detector circuit operable to receive the series of data samples and to provide a third detected data output; and
wherein the result combining circuit is operable to assert the pattern found output based at least in part on the first detected data output, the second detected data output, and the third detected data output.

9. The data processing circuit of claim 8, wherein the first data detector circuit is a Viterbi algorithm detector circuit, the second data detector circuit is a threshold detector circuit, and the third data detector circuit is a two state detector circuit.

10. The data processing circuit of claim 1, wherein the data processing circuit is implemented as part of an electronic device that is selected from a group consisting of: a storage device and a data receiver.

11. The data processing circuit of claim 1, wherein the data processing circuit is implemented as an integrated circuit.

12. The data processing circuit of claim 1, wherein the data processing circuit further comprises:
an analog front end circuit operable to receive an analog signal and to provide a series of samples, and wherein the series of data samples is a derivative of the series of samples.

13. The data processing circuit of claim 12, wherein the analog front end circuit includes:
an amplifier circuit operable to receive the analog signal and to provide an amplified output; and
an analog to digital converter circuit operable to receive the amplified output and to provide the series of samples corresponding to the derivative of the amplified output.

14. The data processing circuit of claim 13, wherein the series of data samples is the same as the derivative of the series of samples, and wherein the derivative of the amplified output is the same as the amplified output.

15. A method for pattern detection, the method comprising:
receiving a series of data samples;
performing a first data detection on the series of data samples to yield a first detected output;
performing a second data detection on the series of data samples to yield a second detected output, wherein the second data detection is different from the first data detection; and
asserting a pattern found signal based at least in part on the first detected output and the second detected output.

16. The method of claim 15, wherein:
the first data detection is selected from a group consisting of: a threshold data detection, a two state data detection, and a Viterbi algorithm data detection; and
the second data detection is selected from a group consisting of: a threshold data detection, a two state data detection, and a Viterbi algorithm data detection.

17. The method of claim 15, the method further comprising:
performing a third data detection on the series of data samples to yield a third detected output, wherein the third data detection is different from the first data detection and the second data detection; and
asserting the pattern found signal based at least in part on the first detected output, the second detected output, and the third detected output.

18. The method of claim 17, wherein:
the first data detection is a Viterbi algorithm data detection;
the second data detection is a threshold data detection; and
the third data detection is a two state data detection.

19. The method of claim 17, wherein the first data detection, the second data detection, and the third data detection are performed in parallel.

20. The method of claim 15, wherein the first data detection and the second data detection are performed in parallel.

21. A storage device, the storage device comprising:
a storage medium including information;
a read head disposed in relation to the storage medium, wherein the read head is operable to sense the information and to provide a corresponding analog signal;
an analog front end circuit operable to receive the analog signal and to provide a series of samples, wherein the analog front end circuit includes:
an amplifier circuit operable to receive the analog signal and to provide an amplified output; and
an analog to digital converter circuit operable to receive the amplified output and to provide the series of samples corresponding to the derivative of the amplified output;
a pattern detection circuit including:
a Viterbi algorithm detector circuit operable to receive a series of data samples and to provide a first detected data output;
a threshold detector circuit operable to receive the series of data samples and to provide a second detected data output;
a two state detector circuit operable to receive the series of data samples and to provide a third detected data output; and
a result combining circuit operable to assert a pattern found output based at least in part on the first detected data output, the second detected data output, and the third detected data output.

* * * * *